United States Patent
Rho

(10) Patent No.: US 7,527,122 B2
(45) Date of Patent: May 5, 2009

(54) ELECTRIC POWER STEERING SYSTEM EQUIPPED WITH WORM GEAR CLEARANCE COMPENSATOR

(75) Inventor: Heedong Rho, Pyeongtaek-si (KR)

(73) Assignee: Mando Corporation, Pyeongtaek-si (KR)

( * ) Notice: Subject to any disclaimer, the term of this patent is extended or adjusted under 35 U.S.C. 154(b) by 306 days.

(21) Appl. No.: 11/544,342

(22) Filed: Oct. 6, 2006

(65) Prior Publication Data
US 2007/0107976 A1 May 17, 2007

(30) Foreign Application Priority Data
Nov. 2, 2005 (KR) .................. 10-2005-0104448

(51) Int. Cl.
*B62D 5/04* (2006.01)
*F16H 1/16* (2006.01)

(52) U.S. Cl. ............... 180/444; 180/443; 180/446; 74/427

(58) Field of Classification Search ........... 180/443, 180/444, 446
See application file for complete search history.

(56) References Cited

U.S. PATENT DOCUMENTS

| 6,725,964 B2* | 4/2004 | Appleyard .................. 180/444 |
| 6,769,507 B2* | 8/2004 | Murakami et al. ........... 180/444 |
| 7,213,677 B2* | 5/2007 | Nakamura et al. ........... 180/444 |
| 2004/0149512 A1* | 8/2004 | Tsutsui et al. ................ 180/443 |
| 2004/0182188 A1 | 9/2004 | Nakamura et al. |
| 2005/0224278 A1* | 10/2005 | Segawa ........................ 180/444 |
| 2006/0169528 A1* | 8/2006 | Yuasa et al. .................. 180/444 |
| 2006/0191738 A1* | 8/2006 | Eda et al. ..................... 180/444 |
| 2007/0102228 A1* | 5/2007 | Shiina et al. ................. 180/444 |
| 2008/0149413 A1* | 6/2008 | Kiforiuk et al. .............. 180/444 |

* cited by examiner

*Primary Examiner*—Paul N Dickson
*Assistant Examiner*—Marc A Scharich
(74) *Attorney, Agent, or Firm*—Lahive & Cockfield, LLP; EuiHoon Lee

(57) ABSTRACT

Disclosed is an electric power steering system including a housing; a steering shaft positioned in the housing; a worm wheel mounted on the steering shaft; a worm shaft; a worm gear formed on the worm shaft so as to mesh with the worm wheel; a motor for driving the worm shaft; a first worm shaft bearing positioned on an end of the worm shaft; and an elastic member for applying a load to the first worm shaft bearing in a diametric direction, the elastic member being formed by double-folding a leaf spring in an approximately U-shaped configuration, both ends of the elastic member being supported by the housing, a central portion of the elastic member abutting an outer peripheral surface of the first worm shaft bearing.

4 Claims, 2 Drawing Sheets

ELECTRIC POWER STEERING SYSTEM EQUIPPED WITH WORM GEAR CLEARANCE COMPENSATOR

RELATED APPLICATION

This application claims convention priority to Korean patent application No. 2005-104448 filed on Nov. 2, 2005, the content of which is incorporated by reference.

FIELD OF THE INVENTION

The present invention relates to an electric power steering system equipped with a worm gear clearance compensator. More particularly, the present invention relates to an electric power steering system including a steering wheel, a worm wheel mounted on the steering wheel, a worm shaft, a worm gear positioned on the worm shaft so as to mesh with the worm wheel, a motor for driving the worm shaft, a first worm shaft bearing, and an elastic member for applying a load to the first worm shaft bearing in the diametric direction so that, even when the worm gear is worn down, the worm gear continuously meshes with the worm wheel with no clearance.

DESCRIPTION OF THE PRIOR ART

Recent R&D in the vehicular steering system industry is directed to providing both safety (i.e. stable steering) and convenience (i.e. smooth and convenient steering). In line with such trends, various types of power steering systems have been developed, including those using hydraulic power and those using electric power. Electric power steering systems have been increasingly used in the industry, because they are lighter, consume less energy, and have a better fuel consumption ratio than hydraulic power steering systems.

Electric power steering systems use speed sensors and steering torque sensors so as to sense the driving conditions of vehicles. Based on the sensed conditions, ECUs actuate motors so as to assist in steering. At a low speed, the electric power steering systems provide flexible and convenient steering conditions and, at a high speed, provide tight and stable steering conditions. In addition, the systems enable rapid steering in the case of an emergency. As such, the electric power steering systems aim at providing drivers with optimal steering conditions.

Electric power steering systems are classified into various types according to the mounting position. For example, a C-EPS (Column Assist Type Electric Power Steering) system is positioned on a steering column together with an electric motor. The steering column fixes a steering shaft, which connects a steering wheel inside a driving compartment to a gearbox beneath the compartment, to a chassis. When the driver operates the steering wheel, resulting rotational force is transmitted to the gearbox via the steering system.

FIG. 1 is a sectional view showing the internal structure of a C-EPS system 100 according to the prior art. The system includes a worm shaft 140; a worm gear 130 positioned on the middle of the worm shaft 140; first and second worm shaft bearings 150 and 160 positioned on both ends of the worm shaft 140, respectively, so as to support the worm shaft 140; a motor shaft 170 connected to the worm shaft 140; and a motor 180 for driving the worm shaft 140.

A worm wheel 120 is positioned on the circumference of the worm gear 130 so as to mesh with it. The worm wheel 120 is mounted on a steering shaft 110, which transmits rotational force from a steering wheel (not shown) operated by the driver, so that rotational force from the worm shaft 140, which is driven by the motor 180, is transmitted to the steering shaft 110.

Based on driving conditions of the vehicle, an ECU controls the operation of the motor 180 so that, in addition to the rotational force from the steering wheel (not shown) operated by the user, rotational force from the worm shaft 140, which is driven by the motor 180, is transmitted to the steering shaft 110. As such, stable and smooth steering conditions are maintained.

The worm wheel 120 and the worm shaft 140, which mesh with each other in a worm gear mode, are mounted inside a housing 190 to be protected from the outside. However, intermeshing teeth of gears are gradually worn down, as is clear from the enlarged view of worm gear teeth shown in FIG. 1 (dotted lines). As the degree of wear increases, the clearance between intermeshing teeth of the worm wheel 120 and the worm gear 130 increases. Consequently, the backlash increases, and rattle noise occurs.

SUMMARY OF THE INVENTION

Accordingly, the present invention has been made to solve the above-mentioned problems occurring in the prior art, and an object of the present invention is to provide an electric power steering system equipped with a worm gear clearance compensator, the system including a steering wheel, a worm wheel mounted on the steering wheel, a worm shaft, a worm gear positioned on the worm shaft so as to mesh with the worm wheel, a motor for driving the worm shaft, a first worm shaft bearing, and an elastic member for applying a load to the first worm shaft bearing in the diametric direction so that, even when the worm gear is worn down, the worm gear continuously meshes with the worm wheel with no clearance.

In order to accomplish this object, there is provided an electric power steering system including a housing; a steering shaft positioned in the housing; a worm wheel mounted on the steering shaft; a worm shaft; a worm gear formed on the worm shaft so as to mesh with the worm wheel; a motor for driving the worm shaft; a first worm shaft bearing positioned on an end of the worm shaft; and an elastic member for applying a load to the first worm shaft bearing in a diametric direction, the elastic member being formed by double-folding a leaf spring in an approximately U-shaped configuration, both ends of the elastic member being supported by the housing, a central portion of the elastic member abutting an outer peripheral surface of the first worm shaft bearing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
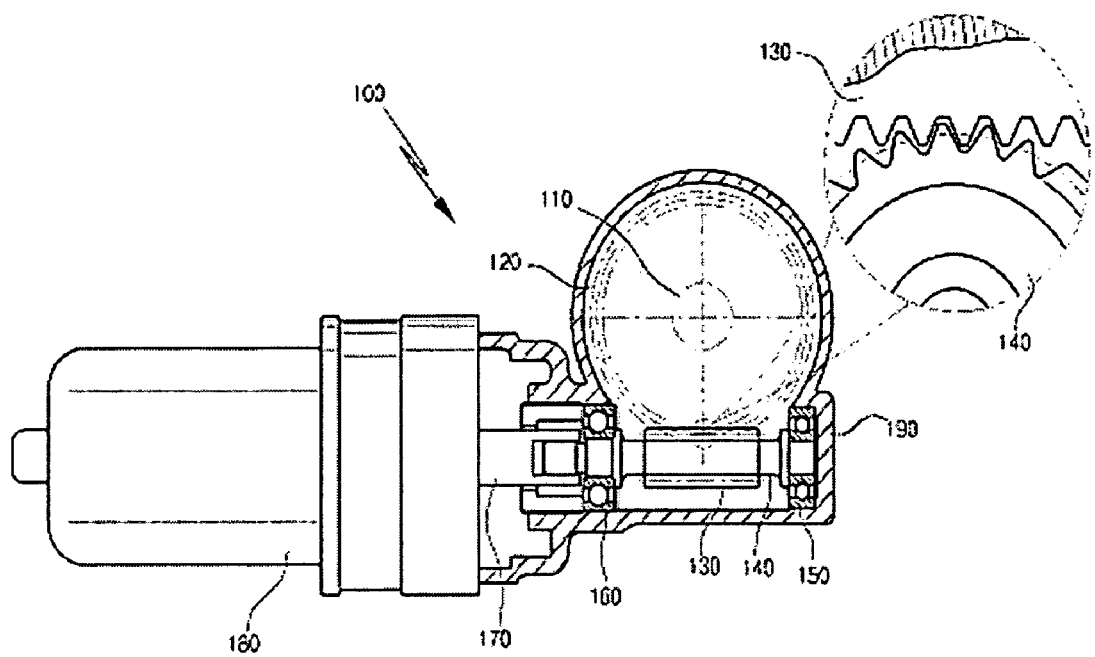
FIG. 1 is a sectional view showing the internal structure of a C-EPS system according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
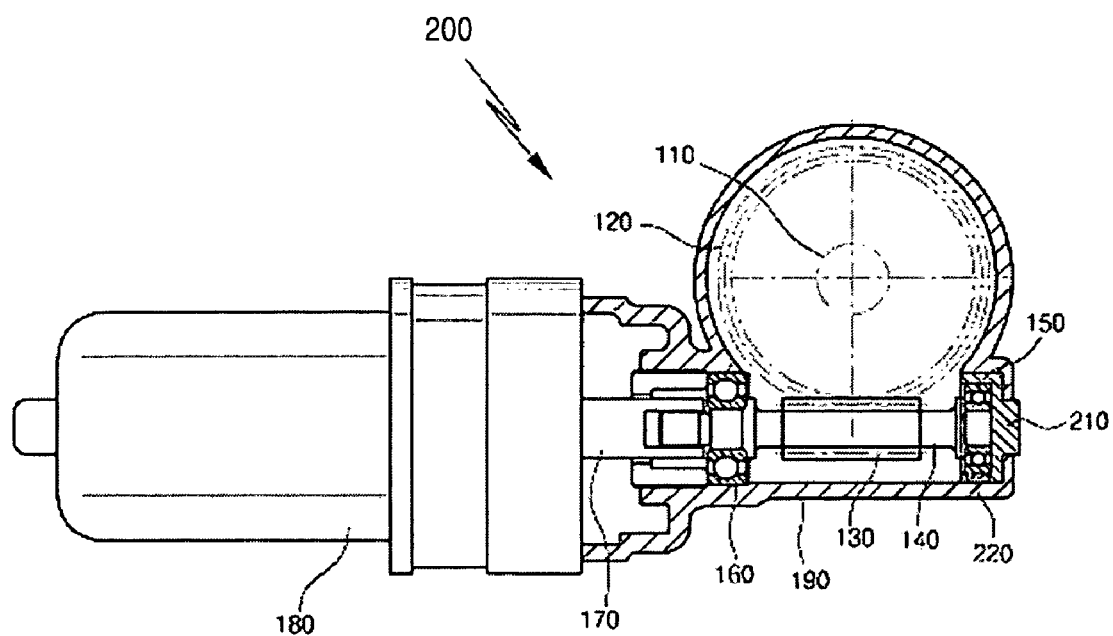
FIG. 2 is a sectional view showing the internal structure of a C-EPS system according to a preferred embodiment of the present invention.

FIG. 2 is a sectional view showing the internal structure of a C-EPS system 200 according to a preferred embodiment of the present invention. The system includes a worm shaft 140; a worm gear 130 positioned on the middle of the worm shaft 140; first and second worm shaft bearings 150 and 160 positioned on both ends of the worm shaft 140, respectively, so as to support the worm shaft 140; a motor shaft 170 connected to the worm shaft 140; and a motor 180 for driving the worm shaft 140.

A worm wheel 120 is positioned on the circumference of the worm gear 130 so as to mesh with it. The worm wheel 120 is mounted on a steering shaft 110, which transmits rotational force from a steering wheel (not shown) operated by the driver, so that rotational force from the worm shaft 140, which is driven by the motor 180, is transmitted to the steering shaft 110. A cap-shaped case 210 partially protrudes out of a housing 190 while enclosing a surface of the first worm shaft bearing 150, as well as its outer peripheral surface. An elastic member 220 is positioned inside the case 210 near its lower end.

Figure 3A:
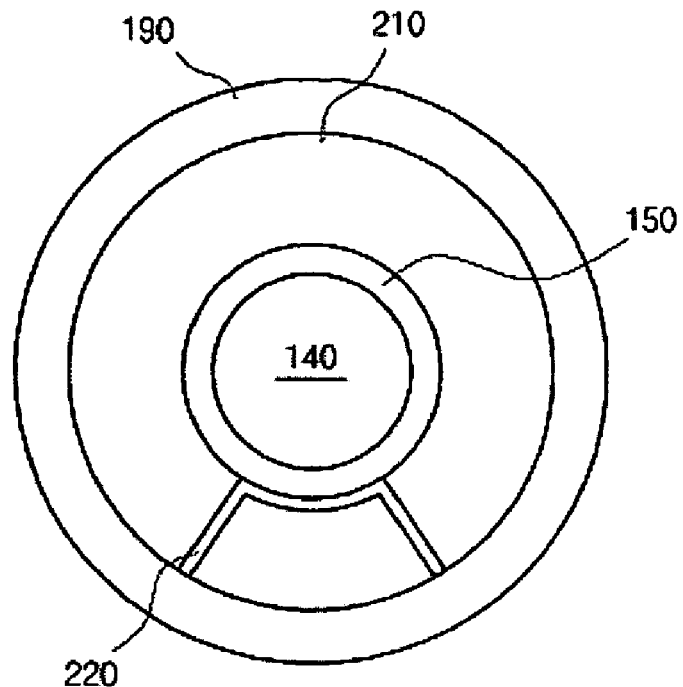
FIG. 3a is a lateral sectional view showing a case according to the present invention.
Figure 3B:
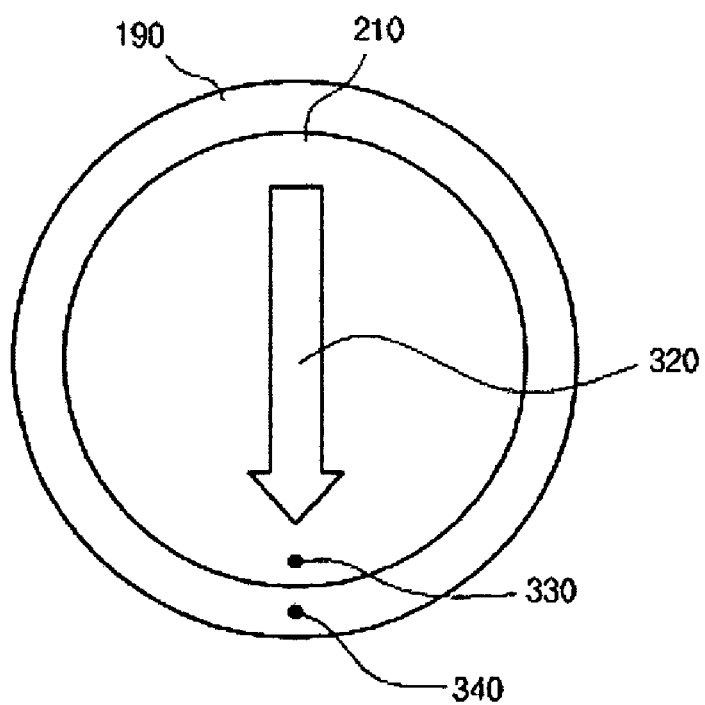
FIG. 3b is a top view showing a case according to the present invention.

FIG. 3a is a lateral sectional view showing a case according to the present invention, and FIG. 3b is a top view of the case.

The case 210 is made of rubber or any other elastic material. The case 210 fixes the first worm shaft bearing 150 to the housing 190 with the worm shaft 140 inserted therein. In addition, the case 210 absorbs vibration occurring when the worm shaft 140 and the worm wheel 120 mesh with each other and rotate together.

The lower side of the interior of the case 210 near its lower end is supported by the housing 190, and the upper side thereof is provided with an elastic member 220 so as to support the fist worm shaft bearing 150. As a result, a load is applied to the first worm shaft bearing 150 in the diametric direction so that, even when the worm gear 130 is worn down, the worm gear 130 and the worm wheel 120 continuously mesh with each other with no clearance.

An identification mark, such as an arrow 320, is made on a surface of the case 210, which protrudes out of the housing 190, so as to indicate the direction of the elastic member 220. A first mark 330 is made near the end of the arrow 320. A second mark 340 is made on the external, vertical lower end of the housing 190, into which the case 210 is inserted, so that the arrow 320, the fist mark 330, and the second mark 340 are on the same line. This enables the elastic member 220 to apply force to the first worm shaft bearing 150 in the vertically upper direction when the case 210 is assembled to the housing 190.

As mentioned above, the electric power steering system equipped with a worm gear clearance compensator according to the present invention is advantageous in that, when there is clearance between intermeshing teeth of the worm wheel and the worm gear, the case, which has elastic properties, and the elastic member, which applies a load to the bearing in the diametric direction, displace the worm shaft and compensate for the clearance. As such, the driver is provided with smooth and convenient steering conditions with no vibration and noise.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electric power steering system comprising:
    a housing;
    a steering shaft positioned in the housing;
    a worm wheel mounted on the steering shaft;
    a worm shaft, the worm wheel being positioned on an upper circumference of the worm shaft;
    a worm gear formed on the worm shaft so as to mesh with the worm wheel;
    a motor for driving the worm shaft;
    a worm shaft bearing positioned on an end of the worm shaft to support the worm shaft; and
    an elastic member positioned only under a lower peripheral surface of the worm shaft bearing to apply force to the worm shaft bearing in a vertical direction so that the elastic member displaces the worm shaft toward the worm wheel to compensate for a clearance between the worm shaft and the worm wheel, the elastic member being formed by double-folding a leaf spring in an approximately U-shaped configuration, both ends of the U-shaped elastic member being supported by a lower portion of the housing, a central portion of the U-shaped elastic member abutting the lower peripheral surface of the worm shaft bearing.

2. The electric power steering system as claimed in claim 1, wherein the worm shaft bearing and the elastic member are inserted into a case and fixed to the housing.

3. The electric power steering system as claimed in claim 2, wherein an arrow and a first mark are made on a portion of the case, the portion being exposed out of the housing, so as to indicate a direction of the leaf spring.

4. The electric power steering system as claimed in claim 3, wherein a second mark is made on a vertical lower portion of the housing, the case being mounted on the vertical lower portion, so as to fix a position of the leaf spring when the case is assembled to the housing.

* * * * *